Patented June 27, 1933

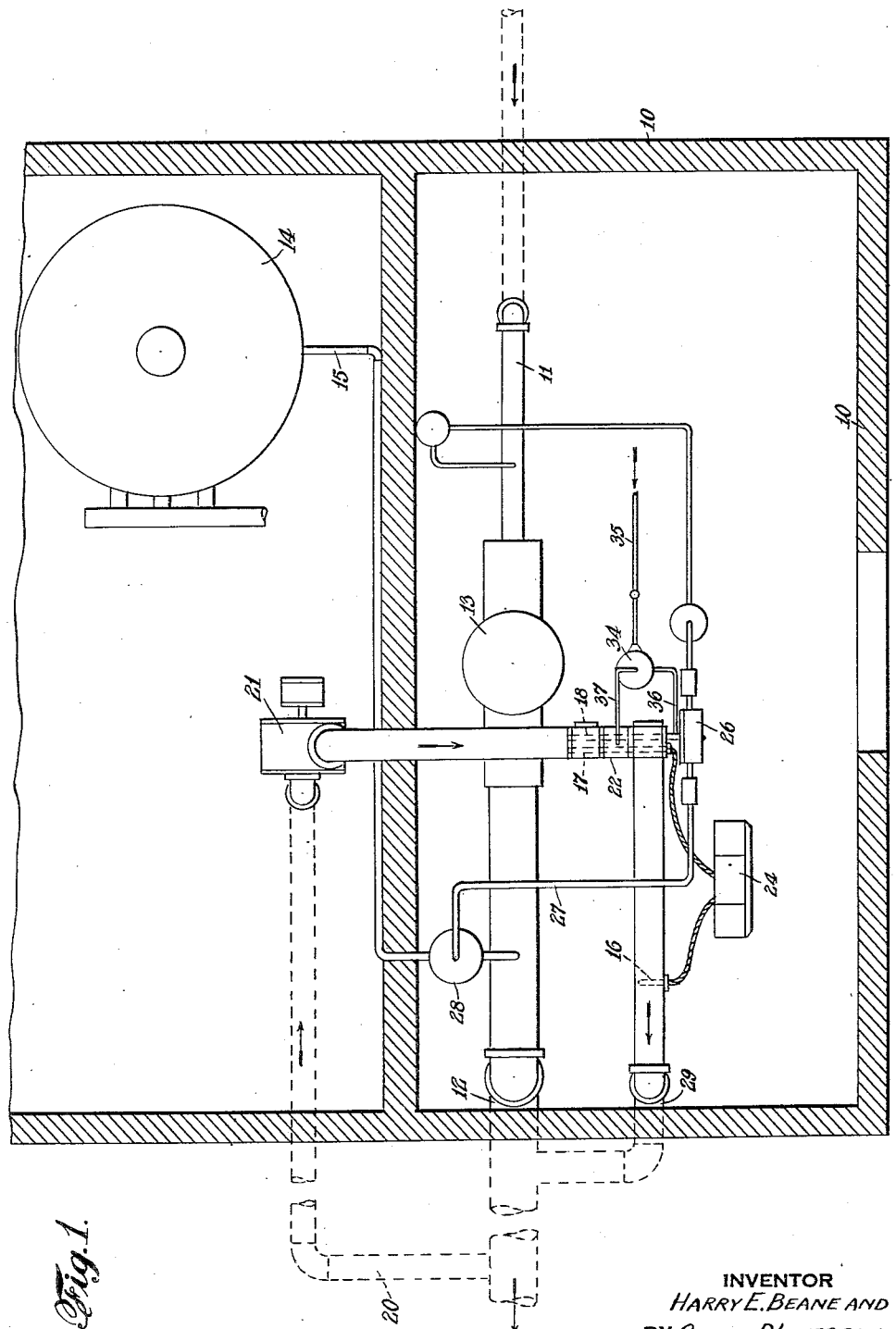

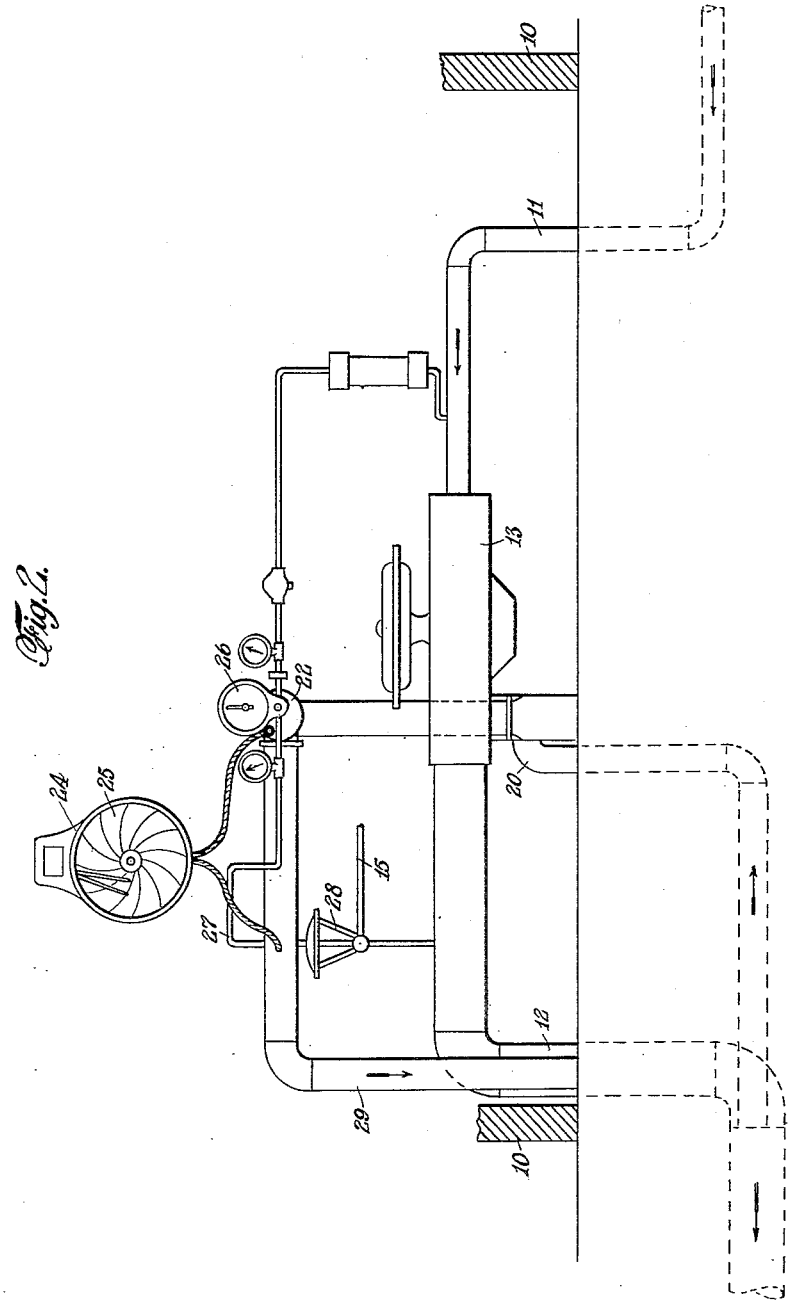

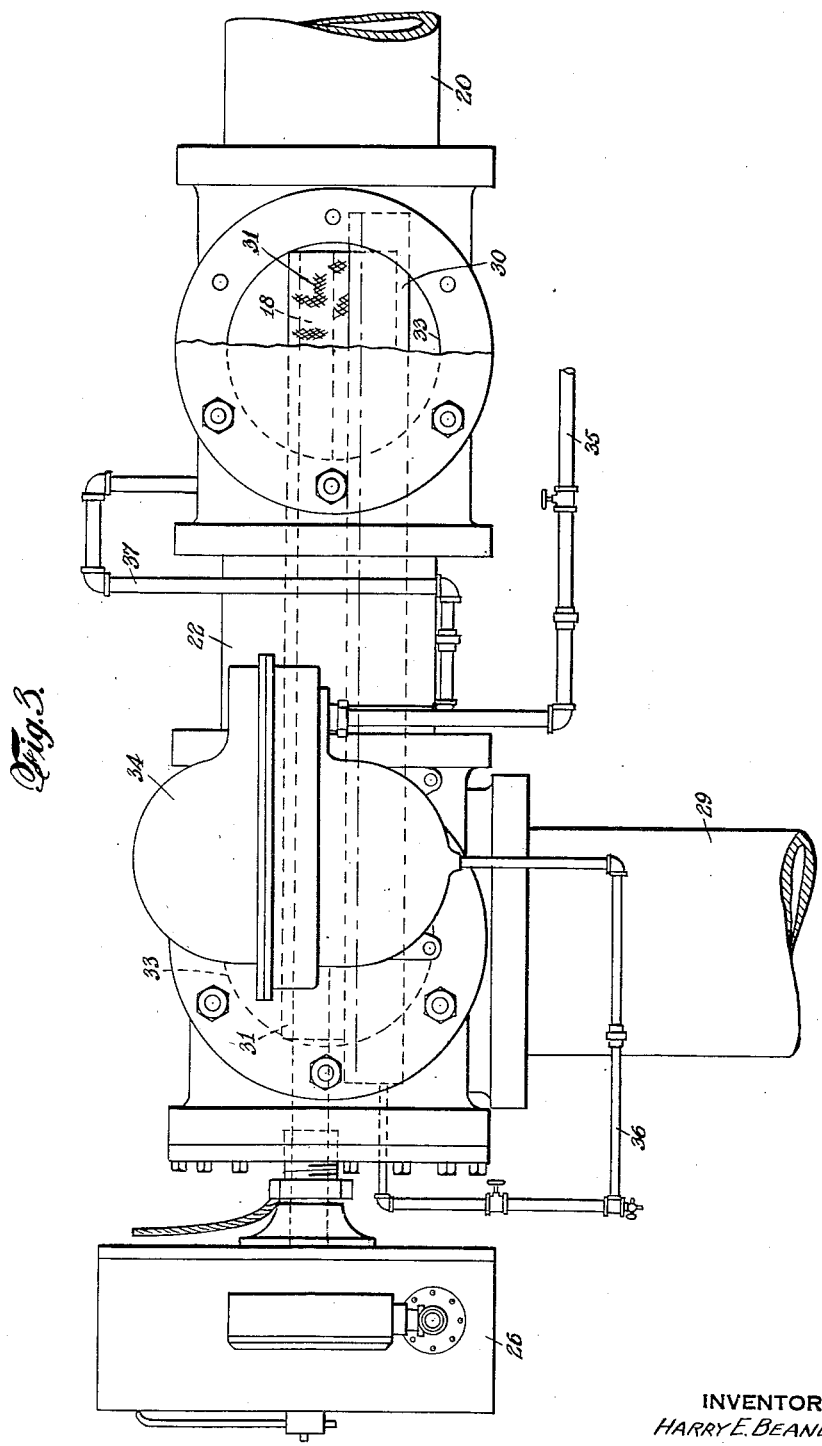

1,915,971

UNITED STATES PATENT OFFICE

HARRY E. BEANE, OF PITTSBURGH, PENNSYLVANIA, AND GEORGE P. LONERGAN, OF KANSAS CITY, MISSOURI, ASSIGNORS TO THE BRISTOL COMPANY, OF WATERBURY, CONNECTICUT, A CORPORATION OF CONNECTICUT

SYSTEM FOR MAINTAINING A PREDETERMINED MOISTURE CONTENT OF NATURAL GAS

Application filed July 23, 1931. Serial No. 552,674.

The invention relates to a system for regulating the relative humidity of natural gas as distributed for commercial use. This gas as received from the wells is of very low moisture content, and considerable difficulty is involved in its transmission, more particularly in that it causes pipe joints to dry out because of the lack of moisture in the gas, resulting in gas leakage. Heretofore, it has been the practice to inject moisture at frequent points along the pipe lines which operation, however, has been manually performed and is not entirely satisfactory owing to the unreliability of operatives and the difficulty in securing and maintaining accurate humidity conditions under the varying factors involved.

The invention has for an object to effect automatically this introduction of moisture, preferably to a degree of substantially complete saturation, and thus maintain more effective operation of the distribution system. A further object of the invention is to maintain this saturation condition under all variations in load on the distribution system.

It is desirable, also, to maintain the humidity of the gas within extremely close limits, which results in very small temperature differences between means, such as wet and dry bulb thermometers, utilized in determining the actual relative humidity. As understood, the temperature registered by the wet bulb thermometer is always lower than the surrounding gas temperature when the gas is below the saturation point; and the degree of depression of the wet bulb thermometer is directly proportional to the amount of water vapor in the air at the temperature indicated. Provision is therefore made for mechanism subject to this difference of the wet bulb and dry bulb temperatures and for controlling thereby the supply of moisture to the distribution system.

In carrying out the invention, a wet bulb thermometer element is designed to be subjected to the gas of the distribution system, for example, by bleeding a portion therefrom and, preferably, at a point somewhat remote from the point where the moisture is introduced into the line. The introduction of the desired moisture, in the form of steam, is readily controlled by a fluid actuated means in turn under the control and regulation of apparatus governed by the said wet bulb thermometer element which is subjected to a sample of the distribution line gas passing over said wet bulb element as a continuous stream.

The nature of the invention, however, will best be understood when described in connection with the accompanying drawings, in which:

Fig. 1 is a fragmentary horizontal section through a building housing the various apparatus utilized in the system.

Fig. 2 is a similar vertical section.

Fig. 3 is an enlarged side elevation of the humidity controller apparatus with novel container for wet bulb thermometers of the controller and recording devices.

Referring to the drawings, 10 designates the walls of a building into which is brought the main 11 for supplying natural gas from a suitable source (not shown). An outlet or distribution main 12 leaves the building at its opposite end and intermediate means such as a reducing valve, indicated at 13, is provided for regulating the pressure of the distributed gas to the desired value. A steam boiler 14 is also provided to furnish steam, through the line 15, to the distribution main 12, the supply being controlled in the manner hereinafter more fully set forth.

In accordance with the invention, the supply of this steam to the distribution main 12 is to be regulated in conformity with the humidity conditions prevailing in the said main and in such a manner that the gas flowing therethrough is maintained substantially in a moisture saturated condition. To this end, provision is made for exposing, respectively, a dry bulb thermometer 16 and wet bulb thermometers 17 and 18 to the gas of the distribution main for measuring and controlling purposes. As for various reasons it is not desirable to include the wet bulb thermometers directly in the main 12, provision is further made for bleeding a sample of the gas from said distribution system. For example, a tap 20 may be made at a point more or less remote from the building 10 to the distribution main 12, and the gas brought from the latter through the action of a suction fan 21 to circulate continuously the sample through a measuring pipe section 22 into which extend the said wet bulb thermometers 17 and 18, the dry bulb thermometer being inserted at any convenient point in the sampling line. The thermometers 16 and 17 are connected to a duplex recording instrument 24 where there may be recorded upon a record chart 25, common to both, the actual wet and dry prevailing temperatures of the gas passing through the bleeder connection.

The other thermometer or expansion member 18 is connected to a controlling device 26 which may be of any well-known or special construction and designed to regulate the supply of fluid, such as compressed air or the said gas supply, the same being directed thereto through a pipe 27 to a fluid pressure regulated valve such as the diaphragm motor valve 28. This valve may be of any well-known or special type and is designed to control the delivery of steam from pipe 15 to the distribution main 12 and preferably at a point in proximity to the measuring section 22, that is to say within the building 10.

While the arrangement described affords regulation of the humidity conditions at substantially a predetermined temperature of the gas, which remains more or less constant, it will be understood that suitable provision, either manual or automatic, may be made for adjusting the control in installations where an appreciable variation is likely to occur.

The outlet 29 from the measuring section is connected to the distribution main 12 in proximity to the building to return the sample to the distribution main which is thus shunted for the purpose of circulating a suitable sample for effective regulation of the moisture content of the distributed gas.

By locating the intake point 20 sufficiently far from the point of introduction of the steam, say 100 feet or more, an intimate mixture of gas and moisture will have been effected by the time the sample is taken so that volumes of gas of substantial uniformity may be obtained and circulated through the measuring section, and accurate control secured.

It is preferred, also, in order to further enhance the accuracy of the control to provide for ample water in the water pan 30 of the measuring section which is to this end mounted on the bottom of said section and is designed to have dip into the water thereof the ends of wicks 31 hanging over the wet bulb thermometers 17 and 18 located in the measuring pipe section 22. Openings 33, normally closed, may be provided in the said section for convenience in renewing the wicks. Also, a pressure-tight constant-level water reservoir 34 may be provided, the same having a water connection 35 thereto and an outlet 36 therefrom to the pan 30. Moreover, as it is desirable to maintain the same pressure within the reservoir as prevails in the pipe section and an equalizing connection 37 may be had therebetween.

We claim:

1. In wet thermometer element controlled apparatus comprising a pressure-sealed section for the passage of gas, and a water pan mounted therein for a wick of a wet thermometer element: a constant level reservoir to maintain the water level in said pan, and a pressure-equalizing connection between the said pressure-sealed section and the reservoir.

2. In a system for maintaining a predetermined moisture content of natural gas: a supply main for the gas and a distribution main therefor and communicating therewith, means for introducing steam into the distribution main, a gas-sampling line having its inlet connected to the distribution main at a point remote from the supply main and beyond the steam-introducing means, said gas-sampling line having an outlet connected to the distribution main at a point intermediate its inlet connection thereto and the point of introduction of the steam and in proximity to the latter point, suction means included in said sampling line to bleed and to circulate a portion of the distributed gas through the sampling line and to return it thereto through the gas-sampling line outlet, and means in the gas-sampling line responsive to the humidity conditions of the gas circulated therethrough for controlling the supply of steam delivered to the distribution main by the said steam-introducing means and in accordance with the humidity conditions of the gas beyond said outlet.

3. In a system for maintaining a predetermined moisture content of natural gas: a supply main for the gas and a distribution main therefor and communicating therewith, means for introducing steam into the distribution main, a gas-sampling line having its inlet connected to the distribution main at a point remote from the supply main and beyond the steam-introducing means, said gas-sampling line having an outlet connected to the distribution main at a point intermediate its inlet connection thereto and the point of introduction of the steam and in proximity to the latter point, suction means included in said sampling line to bleed and to circulate a portion of the distributed gas through the sampling line and to return it thereto through the gas-sampling line outlet, and a wet and dry bulb hygrostat located in the gas-sampling line for controlling the supply of steam delivered to the distribution main by the steam-introducing means and in accordance with the humidity conditions of the gas beyond said outlet.

In testimony whereof we affix our signatures.

HARRY E. BEANE.
GEORGE P. LONERGAN.